US012613016B2

(12) United States Patent
Guan et al.

(10) Patent No.: US 12,613,016 B2
(45) Date of Patent: Apr. 28, 2026

(54) PARKING LOT LAMP SUPPORTING MULTIPLE LIGHT PATTERNS

(71) Applicant: RZ Lighting Co., Ltd, Shenzhen (CN)

(72) Inventors: Qiang Guan, Shenzhen (CN); Jinhua Xie, Shenzhen (CN); Jiannong Chen, Shenzhen (CN)

(73) Assignee: RZ Lighting Co., Ltd, Shenzhen (CN)

( * ) Notice: Subject to any disclaimer, the term of this patent is extended or adjusted under 35 U.S.C. 154(b) by 0 days.

(21) Appl. No.: 19/026,170

(22) Filed: Jan. 16, 2025

(65) Prior Publication Data

US 2026/0092686 A1 Apr. 2, 2026

(30) Foreign Application Priority Data

Sep. 30, 2024 (CN) ........................ 202422402162.X

(51) Int. Cl.

| | |
|---|---|
| ***F21S 10/00*** | (2006.01) |
| ***F21S 8/08*** | (2006.01) |
| ***F21V 5/00*** | (2018.01) |
| ***F21V 19/00*** | (2006.01) |
| ***F21V 21/30*** | (2006.01) |
| ***F21V 23/04*** | (2006.01) |
| ***F21W 131/103*** | (2006.01) |
| ***F21Y 115/10*** | (2016.01) |

(52) U.S. Cl.

CPC ............... *F21S 10/00* (2013.01); *F21S 8/088* (2013.01); *F21V 5/007* (2013.01); *F21V 19/0035* (2013.01); *F21V 21/30* (2013.01); *F21V 23/04* (2013.01); *F21W 2131/103* (2013.01); *F21Y 2115/10* (2016.08)

(58) Field of Classification Search

CPC ........... F21S 10/00; F21S 8/088; F21V 5/007; F21V 19/0035; F21V 21/30; F21V 23/04

See application file for complete search history.

(56) References Cited

U.S. PATENT DOCUMENTS

| | | | | |
|---|---|---|---|---|
| 11,674,665 B2 * | 6/2023 | Cornelissen | F21V 11/14 | 359/619 |
| 2016/0010811 A1 * | 1/2016 | Benitez | F21V 11/186 | 362/147 |
| 2019/0041028 A1 * | 2/2019 | Bremerich | F21V 14/08 | |
| 2020/0340637 A1 * | 10/2020 | Yeo | F21V 23/008 | |
| 2021/0259070 A1 * | 8/2021 | Boomgaarden | H05B 45/10 | |
| 2022/0357005 A1 * | 11/2022 | Yeo | F21V 5/02 | |

(Continued)

*Primary Examiner* — Bryon T Gyllstrom

(57) ABSTRACT

A parking lot lamp supporting multiple light patterns includes a lamp body, a lamp board assembly provided in the lamp body, and a lens plate snapped onto the lamp board assembly. A detachable cover plate is further provided on the lamp body for enclosing the lens plate in the lamp body. A plurality of LED light sources is provided on the lamp board assembly, and the lens plate is provided with lenses one-to-one corresponding to the LED light sources. The lenses are configured to form at least two LED light patterns when the lenses are aligned with and misaligned with the LED light sources. The lamp board assembly and the lens plate are provided with corresponding snaps. By means of the snaps, the lens plate and the lamp board assembly form at least two types of snapping positions, and the snapping positions correspond to the LED light patterns.

14 Claims, 5 Drawing Sheets

(56) References Cited

U.S. PATENT DOCUMENTS

| | | | | |
|---|---|---|---|---|
| 2023/0280585 | A1* | 9/2023 | Ai | F21V 7/0083<br>359/577 |
| 2024/0167663 | A1* | 5/2024 | Jurik | F21V 29/85 |
| 2024/0318809 | A1* | 9/2024 | Fannin | F21V 19/0035 |

* cited by examiner

PARKING LOT LAMP SUPPORTING MULTIPLE LIGHT PATTERNS

CROSS REFERENCE TO RELATED APPLICATIONS

The present application claims the benefit of Chinese Patent Application No. 202422402162X filed on Sep. 30, 2024, the contents of which are incorporated herein by reference in their entirety.

TECHNICAL FIELD

The present application relates to the field of parking lot lamps, in particular a kind of parking lot lamp that supports multiple light patterns.

BACKGROUND TECHNOLOGY

At present, the parking lot lamps on the market are basically the types of lamps that only support single power and single color temperature, and cannot realize the function of adjusting light patterns. For example, there are four types of light patterns commonly used in parking lots, namely, T2, T3, T4, and T5. However, there is no flexible switching between various types, and each lamp has one piece of lens that features one light pattern. It can only be replaced as a whole. Although this technical solution is simple and low-cost, it is easy to increase the inventory backlog for middlemen. For consumers, once faced with product upgrades or replacement and maintenance, the corresponding cost is greater. Therefore, these types of lamps have great limitations.

SUMMARY

In order to overcome the shortcomings of the prior art, the present application provides a parking lot lamp that supports multiple light patterns.

A parking lot lamp supporting multiple light patterns includes a lamp body, a lamp board assembly provided in the lamp body, and a lens plate snapped onto the lamp board assembly; a detachable cover plate is further provided on the lamp body, and the cover plate is enclosing the lens plate in the lamp body;

wherein a plurality of LED light sources is provided on the lamp board assembly, the lens plate is provided with lenses one-to-one corresponding to the LED light sources; the lenses are configured to form at least two LED light patterns when the lenses are aligned with and misaligned with the LED light sources;

the lamp board assembly and the lens plate are respectively provided with corresponding snaps; by means of the snaps, the lens plate and the lamp board assembly form at least two types of snapping positions, and the snapping positions correspond to the LED light patterns.

Preferably, the LED light patterns include three types, namely, T2, T3, and T4, when any one of the three types has the lenses aligned with the LED light sources, another two types have the lenses upwardly misaligned or downwardly misaligned with the LED light sources; the snaps support the lens plate and the lamp board assembly to form three types of snapping positions.

Preferably, the lamp board assembly is provided with strip-shaped positioning openings, the lens plate is provided with strip-shaped positioning posts corresponding to the strip-shaped positioning openings; through the snapping of the strip-shaped positioning openings and the strip-shaped positioning posts, the lens plate and the lamp board assembly form at least three snapping positions.

Preferably, the lamp body is further provided with a locking snap; one end of the cover plate is hinged on the lamp body, and another end is fixed by the locking snap.

Preferably, the LED light sources are evenly distributed on the lamp board assembly; and the number and position of the lenses are set up to correspond to the number and position of the LED light sources.

Preferably, the lamp body is further provided with a power adjustment and color temperature adjustment switch; the power adjustment and color temperature adjustment switch is used for controlling the luminous power and the LED color temperature of the parking lot lamp supporting multiple light patterns.

Preferably, it further includes a swivel bracket which is rotatably connected with the lamp body.

The present application provides a kind of parking lot lamp that supports multiple light patterns. In use, when the LED light sources are aligned with the lenses, a commonly used LED light pattern, such as T3, can be obtained. When changing the light pattern, a user first opens the cover plate, and then by adjusting the position of the lens plate, the lenses on the lens plate and the LED light sources on the lamp board assembly are misaligned to obtain another LED light pattern, such as T2 or T4. Alternatively, the user can simply replace the entire lens plate to obtain another LED light pattern, such as T5.

Compared with the prior art, the present technical scheme can support various LED light patterns, and a user can complete the operation with bare hands. This is convenient for maintenance and replacement, and reduces inventory backlog. At the same time, it also supports power adjustment and color temperature adjustment, making the product more widely applicable.

THE SYMBOLS IN THE DRAWINGS ARE AS FOLLOWS

Figure 1:
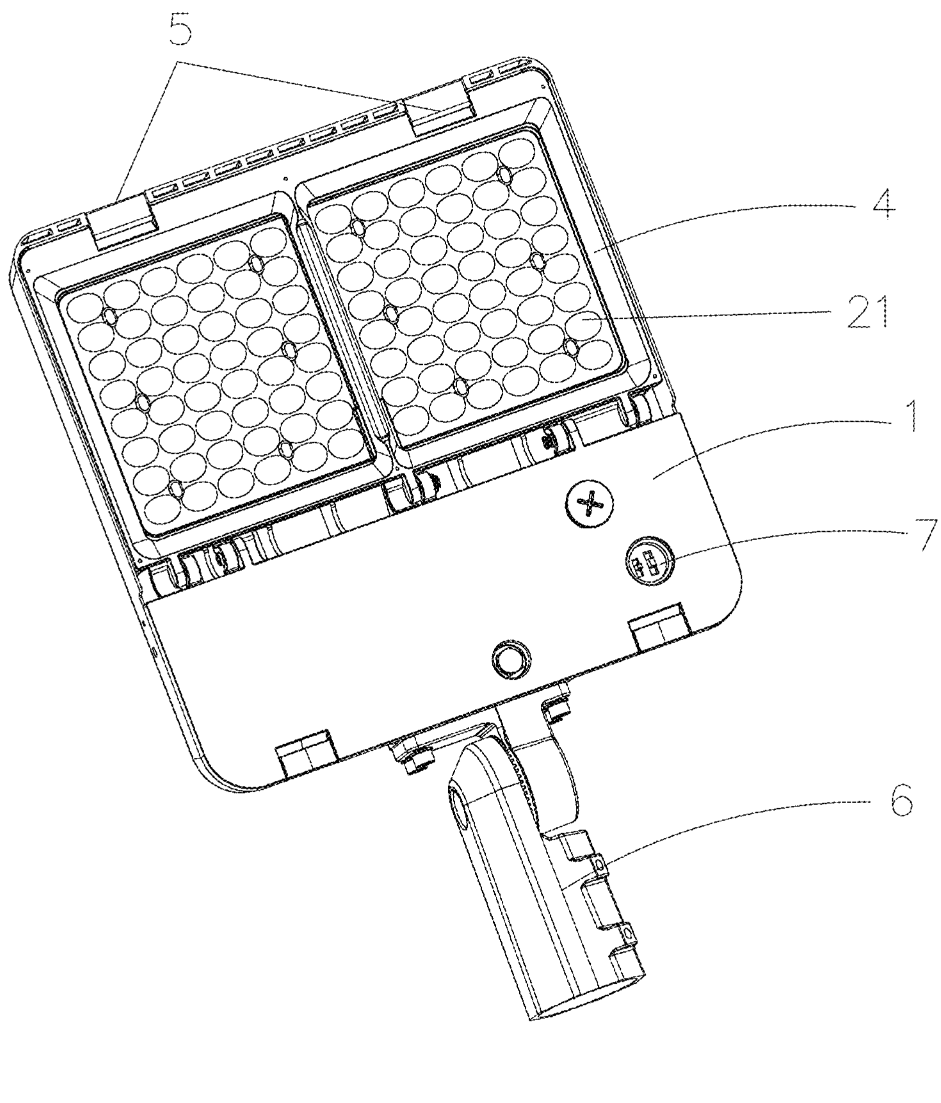
FIG. 1 is a perspective view of the parking lot lamp that supports multiple light patterns in an embodiment of the present application.

1, lamp body; 2, lamp board assembly; 21, LED light source; 22, strip-shaped positioning opening; 3, lens plate; 31, lens; 32, strip-shaped positioning post; 4, cover plate; 5, locking snap; 6, swivel bracket; 7, power adjustment and color temperature adjustment switch.

Detailed Embodiments

In order to make the technical problem to be solved, the technical solution and beneficial effects of the present application more clearly understood, the present application is further described in detail below in conjunction with the accompanying drawings and embodiments. It should be understood that the specific embodiments described herein are only used to explain the present application and are not intended to limit the present application.

A parking lot lamp supporting multiple light patterns is provided. As shown in FIGS. 1-5, it includes a lamp body 1, a lamp board assembly 2 provided in the lamp body, and a lens plate 3 snapped onto the lamp board assembly. The lamp body is further provided with a detachable cover plate 4, and the cover plate encloses the lens plate in the lamp body. A plurality of LED light sources 21 is provided on the lamp board assembly. The lens plate is provided with lenses 31 one-to-one corresponding to the LED light sources. The lenses are configured to form at least two LED light patterns when the lenses are aligned with and misaligned with the LED light sources. The lamp board assembly and the lens plate are respectively provided with corresponding snaps. By means of the snaps, the lens plate and the lamp board assembly form at least two types of snapping positions, and the snapping positions correspond to the LED light patterns.

Among them, the LED light patterns refer to T2, T3, T4, T5, etc. The traditional parking lot lamps often only support one of them. Snaps are used to realize the snapping of the lens plate and the lamp board assembly. When snapping at different positions, the lenses and the LED light sources can form a preset angle, thereby resulting in a preset LED light pattern. The specific structure of the snaps can be varied, and there is no restriction here. The cover plate is designed to be detachable, which is convenient for a user to disassemble and assemble with tools or bare hands, and it is convenient for the user to adjust the position of the lens plate after opening the cover plate.

Furthermore, the LED light sources can be evenly distributed on the lamp board assembly, and the number and position of the lenses are set up to correspond to the number and position of the LED light sources. It is understood that by adjusting the position of the lens plate, the lenses and the LED light sources form an aligned or misaligned relationship, and in turn different LED light patterns are obtained. It is also possible to directly replace the entire lens plate to obtain another LED light pattern.

Furthermore, the lamp body is further provided with a power adjustment and color temperature adjustment switch 7. The power adjustment and color temperature adjustment switch is used for controlling the luminous power and the LED color temperature of the parking lot lamp supporting multiple light patterns.

Furthermore, it further includes a swivel bracket 6, and the swivel bracket is rotatably connected with the lamp body. The swivel bracket can be fixed on a wall, and it is convenient to adjust the illumination angle of the lamp body.

Figure 2:
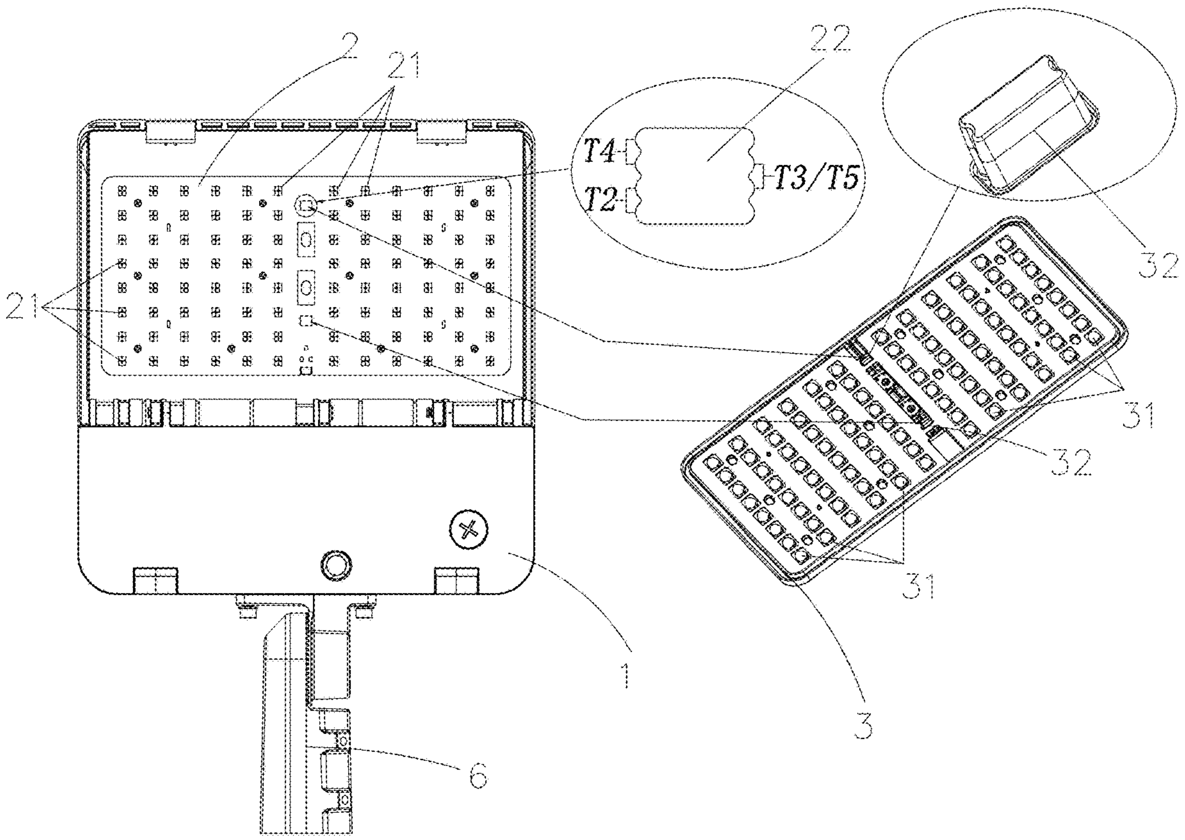
FIG. 2 is a partially disassembled and enlarged diagram of the parking lot lamp that supports multiple light patterns in an embodiment of the present application.

In one embodiment, the LED light patterns include three types, namely, T2, T3, and T4. When any one of the three types has the lenses aligned with the LED light sources, another two types have the lenses upwardly misaligned or downwardly misaligned with the LED light sources. The snaps support the lens plate and the lamp board assembly to form three types of snapping positions. Specifically, as shown in FIG. 2, T3 is the light pattern when the lenses and the LED light sources are aligned, T2 is the effect of the lenses and the LED light sources being upwardly misaligned when the entire lens plate is slightly adjusted upwards, T4 is the effect of the lenses and the LED light sources being downwardly misaligned when the entire lens plate is slightly adjusted downward, and T5 is the effect when replaced with another lens plate.

In one embodiment, the lamp board assembly is provided with strip-shaped positioning openings 22, and the lens plate is provided with strip-shaped positioning posts 32 corresponding to the strip-shaped positioning openings. Through the snapping of the strip-shaped positioning openings and the strip-shaped positioning posts, the lens plate and the lamp board assembly form at least three snapping positions. That is, the snaps adopt the form of strip-shaped positioning openings and strip-shaped positioning posts. The lens plate can be adjusted by sliding up or down, which is easy to operate.

Figure 3:
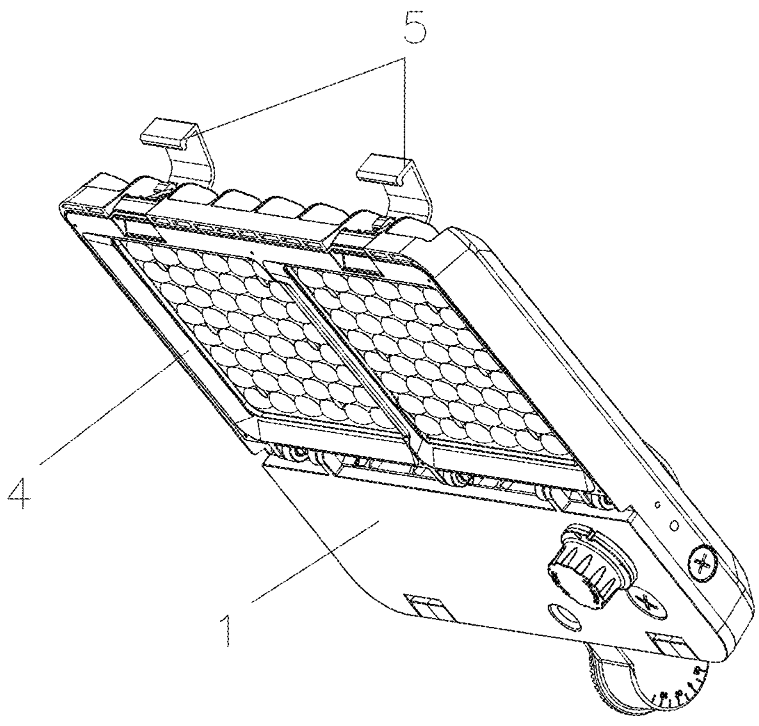
FIG. 3 is a schematic diagram 1 showing the use (open the locking snaps) of the parking lot lamp that supports multiple light patterns in an embodiment of the present application.
Figure 4:
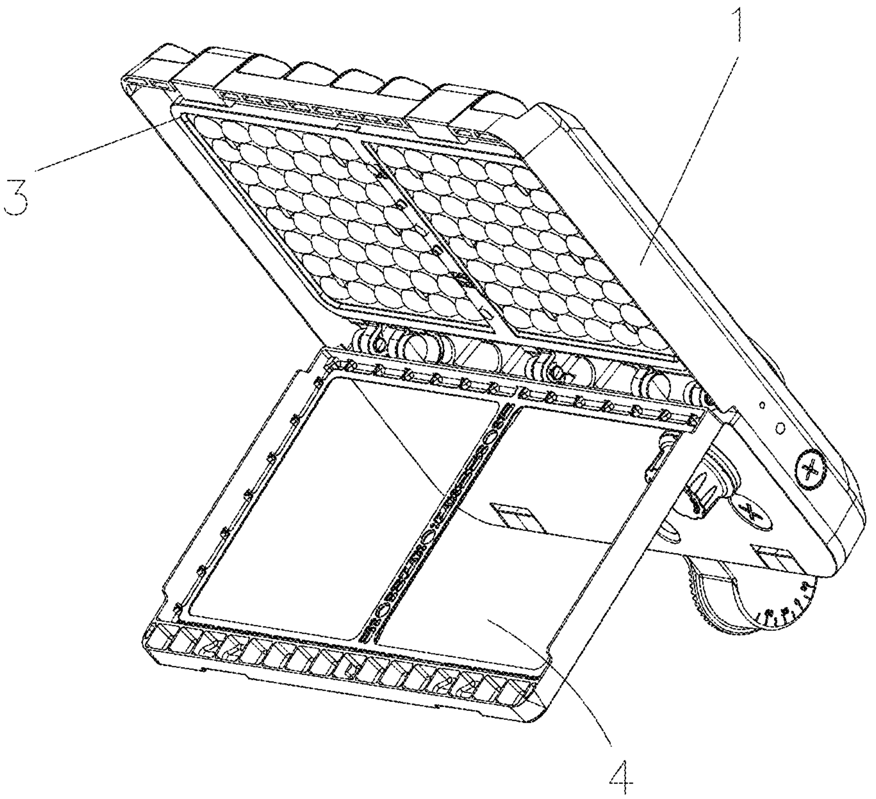
FIG. 4 is a schematic diagram 2 showing the use (open the cover plate) of the parking lot lamp that supports multiple light patterns in an embodiment of the present application.
Figure 5:
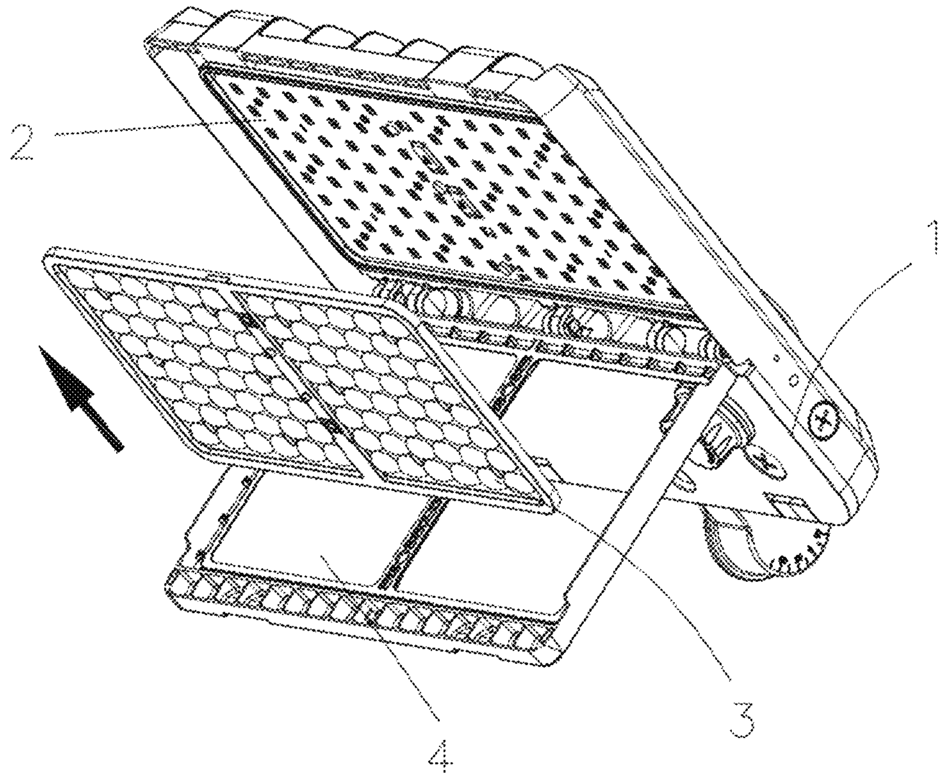
FIG. 5 is a schematic diagram 3 showing the use (adjust the lens plate) of the parking lot lamp that supports multiple light patterns in an embodiment of the present application.

In one embodiment, the lamp body is further provided with a locking snap 5. One end of the cover plate is hinged on the lamp body, and another end is fixed by the locking snap. The operation of adjusting the lens plate after opening the cover plate is shown in FIGS. 3 to 5. It is convenient for a user to operate with bare hands and this reduces maintenance costs.

The above is an elaboration of the parking lot lamp supporting multiple light patterns of the present application, and is used to help understand the present application. However, embodying of the present application is not limited by the above embodiments. Any alteration, modification, substitution, combination, simplification not departing from the principles of the present application shall be an equivalent substitution and shall be included in the scope of protection of the present application.

What is claimed is:

1. A parking lot lamp supporting multiple light patterns, comprising: a lamp body, a lamp board assembly provided in the lamp body, and a lens plate snapped onto the lamp board assembly; the lamp body further provided with a detachable cover plate, the cover plate enclosing the lens plate in the lamp body;

wherein a plurality of LED light sources is provided on the lamp board assembly, the lens plate is provided with lenses one-to-one corresponding to the LED light sources; the lenses are configured to form at least two LED light patterns when the lenses are aligned with and misaligned with the LED light sources;

the lamp board assembly and the lens plate are respectively provided with corresponding snaps; by means of the snaps, the lens plate and the lamp board assembly form at least two types of snapping positions, and the snapping positions correspond to the LED light patterns; and the LED light patterns comprise three types, namely, T2, T3, and T4, when any one of the three types has the lenses aligned with the LED light sources, another two types have the lenses upwardly misaligned or downwardly misaligned with the LED light sources; the snaps support the lens plate and the lamp board assembly to form three types of snapping positions.

2. The parking lot lamp supporting multiple light patterns as claimed in claim 1, wherein the lamp board assembly is provided with strip-shaped positioning openings, the lens plate is provided with strip-shaped positioning posts corresponding to the strip-shaped positioning openings; through the snapping of the strip-shaped positioning openings and the strip-shaped positioning posts, the lens plate and the lamp board assembly form at least three snapping positions.

3. The parking lot lamp supporting multiple light patterns as claimed in claim 2, wherein the lamp body is further provided with a power adjustment and color temperature adjustment switch; the power adjustment and color temperature adjustment switch is used for controlling luminous power and LED color temperature of the parking lot lamp supporting multiple light patterns.

4. The parking lot lamp supporting multiple light patterns as claimed in claim 3, further comprising a swivel bracket, the swivel bracket rotatably connected with the lamp body.

5. The parking lot lamp supporting multiple light patterns as claimed in claim 1, wherein the lamp body is further provided with a locking snap; one end of the cover plate is hinged on the lamp body, and another end is fixed by the locking snap.

6. The parking lot lamp supporting multiple light patterns as claimed in claim 5, wherein the lamp body is further provided with a power adjustment and color temperature adjustment switch; the power adjustment and color temperature adjustment switch is used for controlling luminous power and LED color temperature of the parking lot lamp supporting multiple light patterns.

7. The parking lot lamp supporting multiple light patterns as claimed in claim 6, further comprising a swivel bracket, the swivel bracket rotatably connected with the lamp body.

8. The parking lot lamp supporting multiple light patterns as claimed in claim 1, wherein the LED light sources are evenly distributed on the lamp board assembly; and a number and position of the lenses are set up to correspond to a number and position of the LED light sources.

9. The parking lot lamp supporting multiple light patterns as claimed in claim 8, wherein the lamp body is further provided with a power adjustment and color temperature adjustment switch; the power adjustment and color temperature adjustment switch is used for controlling luminous power and LED color temperature of the parking lot lamp supporting multiple light patterns.

10. The parking lot lamp supporting multiple light patterns as claimed in claim 9, further comprising a swivel bracket, the swivel bracket rotatably connected with the lamp body.

11. The parking lot lamp supporting multiple light patterns as claimed in claim 1, wherein the lamp body is further provided with a power adjustment and color temperature adjustment switch; the power adjustment and color temperature adjustment switch is used for controlling luminous power and LED color temperature of the parking lot lamp supporting multiple light patterns.

12. The parking lot lamp supporting multiple light patterns as claimed in claim 11, further comprising a swivel bracket, the swivel bracket rotatably connected with the lamp body.

13. A parking lot lamp supporting multiple light patterns, comprising: a lamp body, a lamp board assembly provided in the lamp body, and a lens plate snapped onto the lamp board assembly; the lamp body further provided with a detachable cover plate, the cover plate enclosing the lens plate in the lamp body;

wherein a plurality of LED light sources is provided on the lamp board assembly, the lens plate is provided with lenses one-to-one corresponding to the LED light sources; the lenses are configured to form at least two LED light patterns when the lenses are aligned with and misaligned with the LED light sources;

the lamp board assembly and the lens plate are respectively provided with corresponding snaps; by means of the snaps, the lens plate and the lamp board assembly form at least two types of snapping positions, and the snapping positions correspond to the LED light patterns; and the lamp body is further provided with a locking snap; one end of the cover plate is hinged on the lamp body, and another end is fixed by the locking snap.

14. A parking lot lamp supporting multiple light patterns, comprising: a lamp body, a lamp board assembly provided in the lamp body, and a lens plate snapped onto the lamp board assembly; the lamp body further provided with a detachable cover plate, the cover plate enclosing the lens plate in the lamp body;

wherein a plurality of LED light sources is provided on the lamp board assembly, the lens plate is provided with lenses one-to-one corresponding to the LED light sources; the lenses are configured to form at least two LED light patterns when the lenses are aligned with and misaligned with the LED light sources;

the lamp board assembly and the lens plate are respectively provided with corresponding snaps; by means of the snaps, the lens plate and the lamp board assembly form at least two types of snapping positions, and the snapping positions correspond to the LED light patterns; and the lamp body is further provided with a power adjustment and color temperature adjustment switch; the power adjustment and color temperature adjustment switch is used for controlling luminous power and LED color temperature of the parking lot lamp supporting multiple light patterns.

* * * * *